W. E. EMERY.
NUT LOCK.
APPLICATION FILED MAR. 2, 1918.

1,303,784.

Patented May 13, 1919.

Inventor
Walter E. Emery

Witnesses

By Victor J. Evans
Attorney

UNITED STATES PATENT OFFICE.

WALTER E. EMERY, OF PEORIA, ILLINOIS.

NUT-LOCK.

1,303,784.

Specification of Letters Patent.  Patented May 13, 1919.

Application filed March 2, 1918. Serial No. 220,018.

*To all whom it may concern:*

Be it known that I, WALTER E. EMERY, a citizen of the United States, residing at Peoria, in the county of Peoria and State of Illinois, have invented new and useful Improvements in Nut-Locks, of which the following is a specification.

This invention relates to a means for locking a nut on a bolt and has for its object to produce a compressible nut designed, when screwed on a bolt to co-engage with a washer whereby the said nut will be compressed against the bolt to lock both the nut and bolt against turning.

In the drawings I have illustrated a simple and satisfactory embodiment of the improvement, and in the drawings, Figure 1 is a side elevation of the improvement, parts being in section, and the nut being out of engagement with the washer.

Figure 1:
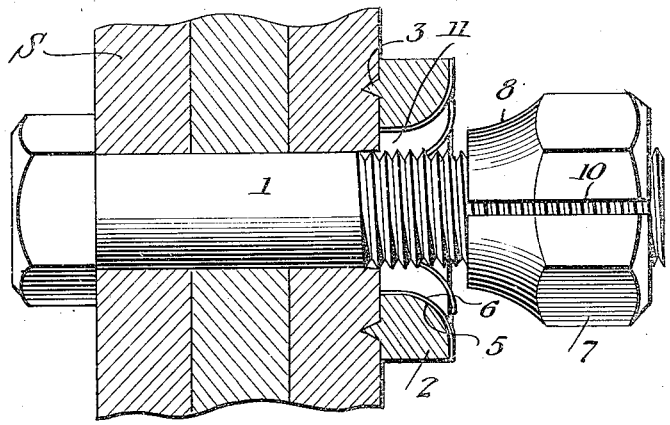
Figure 2:
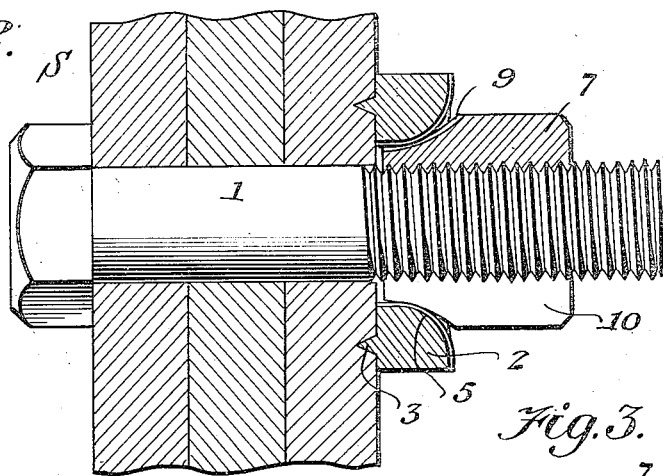
Fig. 2 is a similar view but showing the nut engaged by the washer and compressed against the bolt.
Figure 4:
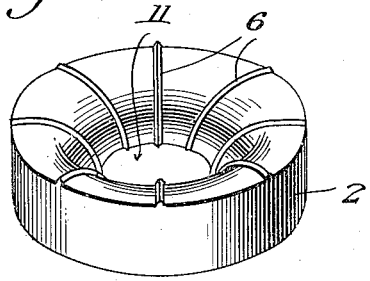
Fig. 4 is a similar view of the washer.
Figure 3:
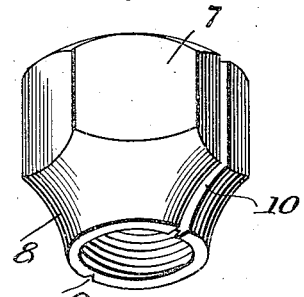
Fig. 3 is a perspective view of the nut.

The bolt 1 is of the ordinary construction and is designed, as illustrated in Figs. 1 and 2 of the drawings, to pass through the plates of a super-structure S.

On the threaded end of the bolt 1 is arranged a washer 2, the same having one of its faces formed with prongs 3 that enter one of the plates of the super-structure. The bore or central opening of the washer defines a comparatively straight portion 11 entering from the face of the washer provided with the prongs, and a dished or concaved portion 5 communicating, of course, with the portion 11 and with the outer face of the washer. The bore or opening defining the round wall or surface 5 and the straight wall or surface 11, is provided at spaced intervals with ribs 6 disposed in radial planes. These ribs are comparatively slight and are substantially V-shaped in cross section, thus providing each of the same with a sharpened edge.

Screwed on the bolt 1 is a nut 7. This nut has its inner face provided with a conical extension which is concaved, as at 8 and which is provided with a single groove or depression 9. The groove 9 has its side wall beveled inwardly so that the said groove is of a substantially V-shape formation. The nut is slit lengthwise on one of the sides thereof providing a longitudinal opening 10. The convexed mouth provided at the rounded surface 5 in the opening or bore of the washer 2, does not exactly conform to the shape of the concaved end of the nut, so that the outer and reduced portion of the concave surface 8 of the nut will first engage with the comparatively straight surface 11 in the bore of the washer, when the nut is being screwed home upon the bolt. The ribs 6 contacting with the reduced end of the nut will have a tendency to force the confronting surfaces provided by the slot or opening 10 in the nut toward each other to compress the threads in the bore of the nut against the threads of the bolt, and when pressure is relieved from the nut the notch or groove 9 will be arranged in a position to receive one of the ribs 6, thus effectively locking the nut on the washer and also the nut in frictional engagement with the bolt.

While I have illustrated and described the nut as provided with a concaved face and the washer provided with a convexed surface to receive the said face, it is to be understood that the relative faces of these elements may be reversed so that the washer may have its outer face concaved and the inner face of the nut may be convexed, and from the foregoing description, when taken in connection with the drawings the simplicity and advantages of the construction will be apparent, it being thought merely necessary to state that the nut may be removed from engagement with the washer and with the bolt by turning the said nut in an unscrewing direction.

Having thus described the invention what I claim is:

The combination with a bolt, of locking means therefor including a washer having an opening of a greater area than the cross sectional diameter of the bolt, said washer, upon the inner face thereof having prongs and having its outer face provided with a rounded depression communicating with the opening and providing a convex surface, ribs disposed in radial planes formed on the concaved surface and on the wall of the opening, and conforming to the shape of both of said surfaces, a split nut for the bolt and washer, said nut having its inner end provided with a conical extension which is concaved and which is of a slightly different contour than the walls provided in the bore of the washer, said concaved surface of the nut having a notch at the end thereof designed to receive one of the ribs of the washer when the nut is screwed on the bolt and the slitted portion thereof compressed by contacting engagement between the bore of the washer and the concaved extension of the nut.

In testimony whereof I affix my signature.

WALTER E. EMERY.